Dec. 14, 1948.  W. R. HICKLER  2,456,006
METHOD OF MANUFACTURING A RESIN-BONDED COMPOSITE PRODUCT
Filed Sept. 27, 1943

Inventor
Walter R. Hickler
By Willis F. Avery
Atty.

Patented Dec. 14, 1948

2,456,006

UNITED STATES PATENT OFFICE 2,456,006

METHOD OF MANUFACTURING A RESIN-BONDED COMPOSITE PRODUCT

Walter R. Hickler, Winthrop, Mass., assignor to The B. F. Goodrich Company, New York, N. Y., a corporation of New York Application September 27, 1943, Serial No. 504,017

4 Claims. (Cl. 154—132)

This invention relates to the manufacture of composite products and is especially concerned with the manufacture of resin-bonded composite products having wood veneer or like surfaces free of resin.

Resin-bonded composite products having wood veneer surfaces are made by bonding a wood veneer sheet to a core member by means of a thermosetting resin, the assembly being subjected to heat and pressure to compact the structure and set the resin. Relatively high molding pressures customarily are employed to effect thorough compacting and condensation of the structure, such high pressures being especially necessary to assure maximum strength characteristics when the core member is made up of unwoven fibers impregnated with resin.

Such high molding pressures tend to force the bonding resin through the wood veneer surface layer, especially when very thin veneers are employed, so that it has been impossible to make a satisfactory resin-bonded product having a wood veneer surface free of resin, even though the resin be carefully confined to the inner portions of the structure when initially assembled.

Thus, the art has been faced with a dilemma. If high molding pressures were employed to secure maximum strength characteristics in the product, then resin was forced through to the outer surface of the wood veneer. On the other hand, if the molding pressures were lowered sufficiently to avoid forcing the resin through the wood, then the structure developed only a fraction of its potential strength, especially in the case of cores formed of unwoven fibers and similar materials.

The present invention escapes the dilemma by utilizing two resins having distinctly different rates of cure and effecting cure of the assembly in two distinct stages. The fibrous or other core member is impregnated with a slow-curing thermo-setting resin, while a thin film or layer of a fast-curing thermo-setting resin is interposed between the core and the wood veneer surface member. The assembly then is subjected to molding heat and pressure, the pressure being held at a low value until the fast-curing resin has substantially set, after which the pressure is increased to a substantially higher value while cure of the slow-curing resin is continued to completion. In the initial stage the molding pressure is maintained at a value sufficient partially to compact the assembly but not to force the resin to the surface of the wood veneer member. In the second stage, the pressure may be increased to any extent necessary to develop maximum strength in the composite product, without danger of forcing the resin to the surface, as the layer of fast-curing resin, then completely cured or set, acts as a dam and blocks flow of resin to the wood when the pressure is increased.

The surface member may comprise any suitable wood veneer sheet or other appropriate material normally penetrable by resins under high pressures. Preferably, however, the surface layer should comprise an extremely thin sheet of wood veneer material of the order of 0.01" thick, which may be understood to include variations up to 0.02" thick. Any wood material obtainable in such very thin sheet form may be used. African mahogany is especially satisfactory and spruce also gives good results. One or more plies of such surface material may be employed, laid either with the grains running in the same direction or cross-wise of each other, as desired, to develop particular strength characteristics in the product. It is also possible to utilize thicker wood veneers up to about 0.125", or thicker, where demanded by service requirements.

Thermo-setting resins having the required fast-curing and slow-curing characteristics are available commercially and require no detailed description. Phenol-aldehyde resins and particularly the familiar phenol-formaldehyde resins are especially satisfactory although the urea-aldehyde and melamine-aldehyde resins also may be used. The relatively slow-curing phenol-formaldehyde resin known as Resinox No. 790 will be found especially satisfactory when used in conjunction with the relatively fast-curing phenol-formaldehyde resin known as Resinox No. 200, although many others will serve equally well. All such resins may be suspended in water, alcohol, or other appropriate solvent or dispersion medium for application to the core material and to the wood veneer material, as is customary in the art.

In order to localize the fast-curing resin at the interface and to facilitate application of the resin, it will be found desirable to associate it with a carrier sheet which may be a sheet of porous material such as bibulous paper or textile fabric, although this expedient is not essential in all cases. Also, a part or all of the fast-curing resin may be applied either to the face of the core member or to the inner face of the surface member, or to both, and either in conjunction with a resin-coated carrier sheet or without such sheet.

The core member likewise may comprise a variety of materials including, but not being limited to, plied structures of various woven and unwoven fibrous materials, either with or without interposed plies of wood veneer or other sheet material.

Preferably, however, the core member comprises a number of plies of unwoven cotton fibers arranged in tenuous web form. It is possible to use fibers of cotton, wool, flax, ramie, pineapple and the like and even silk fibers and rayon or nylon flock, although some difficulty may be experienced in handling silk and especially the artificial silk fibers because of their smooth surface characteristics. Because of its cheapness, ready availability, and twisted fibrous structure, cotton is most satisfactory and will generally be preferred.

The cotton fibers may be arranged in tenuous web form in any known manner. Preferably, however, they are carded and then drawn and spread sidewise to produce an extremely tenuous web in which the fibers are laid in parallel relation. This may be accomplished by passing the cotton fibers through the usual preliminary textile processing operations to prepare them for carding and drawing, then passing the prepared fibers through a conventional carding machine to produce a relatively heavy sliver known as a ribbon lap, then passing the carded ribbon lap through drawing rolls further to draw out the lap until the fibers are arranged in parallel relation in a continuous web or sheet, and, finally, spreading the drawn web sidewise, still further to increase its tenuity. In the present invention, such drawing and spreading preferably should be continued until the fibrous web weighs not more than about one ounce per square yard. For best all around results the tenuity of the sheet should be substantially that represented by a weight of about ½ ounce per square yard. It will be appreciated that a carded and drawn cotton fiber web weighing only ½ ounce per square yard is extremely thin and tenuous. Actually, its effective thickness is of the order of only two or three fiber thicknesses, or about 0.002" thick.

The prepared tenuous fiber sheet should be impregnated with a liquid composition containing a slow-curing thermo-setting resin. To effect such impregnation, the tenuous web may be passed through a bath of the resin composition and then through wringer rolls, or the web may be passed between rolls which are wetted with the composition. In any case the excess liquid is pressed from the sheet after which it is dried either in the open air or in a hot air oven. Extensive experimentation has shown that best results are obtained when substantially an equal weight of resin is associated with the fibers, so that the resin-impregnated fibrous web desirably should weigh not more than 2 ounces per square yard, although it is permissible in some cases to increase the total weight of the impregnated sheet to as much as 2½ ounces per square yard. Best results are secured when a fibrous sheet weighing about ½ ounce per square yard is impregnated evenly with about ½ ounce of resin per square yard to produce a total weight of about one ounce per square yard in the impregnated sheet. Such resin-impregnated tenuous webs may be plied up in any desired number, and with the fibers in the individual plies oriented either parallel to each other or crosswise at varying angles, to build up core structures having any desired directional strength characteristics. As previously indicated, one or more plies of wood veneer, woven textile fabric, or other sheet material, may be interposed between the tenuous cotton plies, all such core plies preferably, however, being thoroughly impregnated with the slow-curing resin.

In making relatively large sheet structures, both the wood and the cotton plies may be lapped at the joints, the resulting differences in thickness being adequately taken up during the pressure molding.

The invention will now be described in greater detail with reference to the accompanying drawings illustrating a specific embodiment of the invention.

Figure 1:
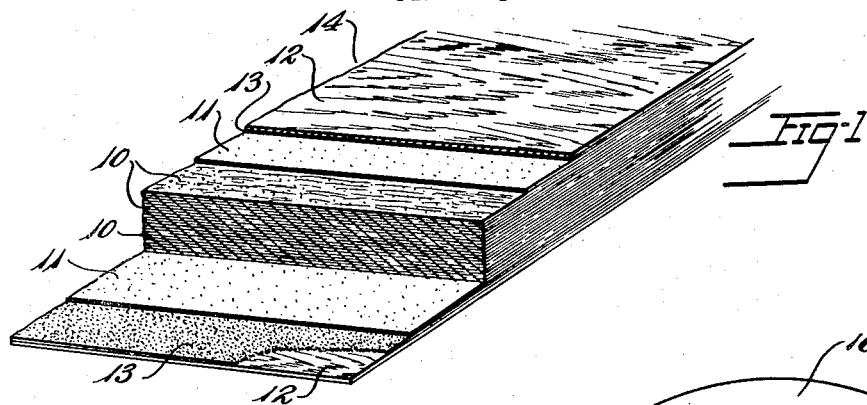
Fig. 1 is a fragmentary perspective view showing the assembled material ready for molding, the various plies being broken away and sectioned for clarity of illustration.

In the specific example illustrated in the drawings, the core member comprises about 60 plies of resin-impregnated tenuous cotton web 10, 10 of the character described, the cotton being impregnated with a slow-curing phenol-formaldehyde resin such as Resinox No. 790. On each face of the core member is superposed a carrier sheet 11, 11 which may be a sheet of high quality paper such as 7 mil. alpha-cellulose impregnated with a fast-curing phenol-formaldehyde resin such as Resinox No. 200. Over the carrier sheets are superposed surface layers 12, 12, each comprising a single ply of 0.01" African mahogany wood veneer material, the wood veneer sheets being coated on their inside faces with thin films 13, 13 of the same fast-curing Resinox No. 200 resin. The composite assembly, indicated in general by the reference numeral 14, then is placed between the platens 15, 15 of a conventional steam-heated hydraulic press 16, and subjected to molding heat and pressure.

Figure 2:
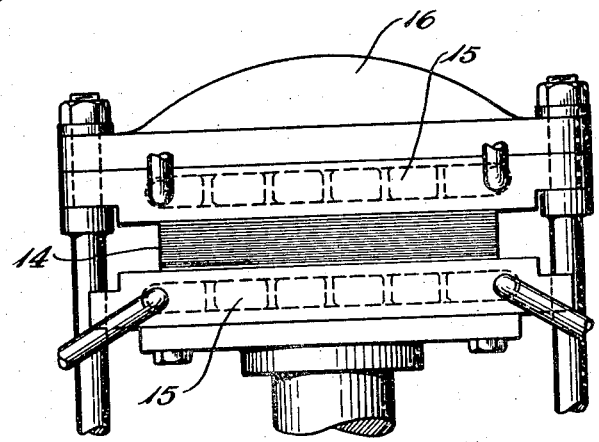
Fig. 2 is an elevational view illustrating the initial stage of the heat and pressure molding operation, the composite material undergoing molding being shown in considerably magnified thickness for clarity of illustration.
Figure 3:
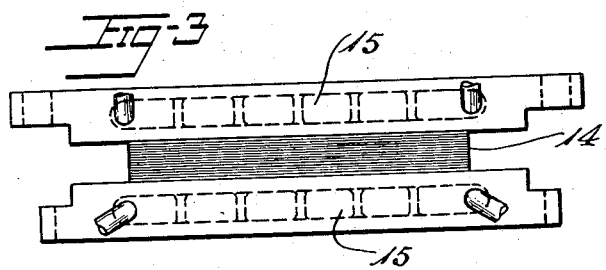
Fig. 3 is a similar view illustrating the second stage of the heat and pressure molding operation, the composite material again being shown in magnified thickness.

In the first stage (Fig. 2) the assembly is subjected to a suitable curing temperature of about 316° F. while the pressure is maintained relatively low, at about 60 pounds per square inch, until the fast-curing resin has substantially set, a period of about 7 minutes being sufficient in this specific case.

Then, for the second curing state (Fig. 2) the pressure is increased to from 600 to 1,000 pounds per square inch and the cure is continued for 15 minutes longer at the same temperature of about 316° F.

Thereafter, the material is cooled in the press for about 15 minutes after which the pressure may be released and the finished sheet removed.

Figure 4:
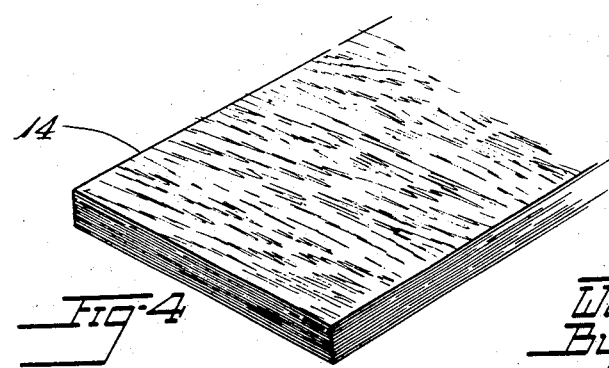
Fig. 4 is a fragmentary perspective view showing a finished composite product embodying the invention.

The finished product 14, shown in Fig. 4, will be about ⅛" thick. The core structure will be well condensed and compacted and the entire assembly will be thoroughly integrated with resulting development of extraordinary strength characteristics. At the same time, both exposed faces of the wood veneer members will be free of resin, so that the composite product may be glued to other materials in the usual way, or finished just as natural wood surfaces are finished.

It will be understood that the curing temperature also may be varied in the two stages and that both the pressures and the temperatures will be subject to considerable variation depending upon the particular resins chosen. The curing characteristics of various commercial resins are well known and these details will be understood by one skilled in the art.

Composite materials made in accordance with the invention will be found especially useful in aircraft structures where exceptional strength characteristics coupled with a resin-free glueable surface are especially advantageous in building non-metal aircraft wherein the various parts must be glued together, as with resin adhesives. The material is by no means limited to such use, however, and will find wide application in various industrial and other products.

Although the invention has been described in considerable detail with reference to certain preferred procedures and materials, it will be understood that numerous modifications and variations may be effected therein without departing from the spirit and scope of the invention as defined by the appended claims.

I claim:

1. A method of manufacturing a resin-bonded composite product having a surface free of resin which comprises arranging in superposed relation a core member comprising a slow-curing thermo-setting resin in a flowable unset state, an intermediate dam member comprising a fast-curing thermo-setting resin in a flowable unset state, and a surface member comprising material normally penetrable by such flowable unset resins under high pressures, the exposed face of the said surface member being free of resin, subjecting the assembly as a unit and while both said resins are still in a flowable unset state to relatively low pressure sufficient partially to compact it but not sufficient to force the resin through the normally penetrable surface member, maintaining the low pressure and heating the assembly as a unit until the fast-curing resin has substantially set, then while the slow-curing resin is still in a flowable unset state substantially increasing the pressure further to compact the assembly and heating until the slow-curing resin has substantially set, the intermediate dam of fast-cured resin serving to block flow of resin through the normally penetrable surface layer when the pressure is increased.

2. A method of manufacturing a resin-bonded composite product having a wood veneer surface free of resin which comprises arranging in superposed relation a core member comprising unwoven fibers impregnated with a slow-curing thermo-setting resin in a flowable unset state, an intermediate dam member comprising a fast-curing thermo-setting resin in a flowable unset state, and a surface member comprising wood veneer material normally penetrable by resins under high pressures, the exposed face of the said wood veneer material being free of resin, subjecting the assembly as a unit and while both said resins are still in a flowable unset state to relatively low pressure sufficient partially to compact it but not sufficient to force the resin through the wood veneer member, maintaining the low pressure and heating the assembly as a unit until the fast-curing resin has substantially set, then while the slow-curing resin is still in a flowable unset state substantially increasing the pressure further to compact the assembly and heating until the slow curing resin has substantially set, the intermediate dam of fast-cured resin serving to block flow of resin through the wood veneer when the pressure is increased.

3. A method of manufacturing a resin-bonded composite product having a wood veneer surface free of resin which comprises arranging in superposed relation a core member comprising unwoven cotton fibers arranged in substantial parallelism in a thin flimsy web impregnated with a slow-curing thermo-setting resin in a flowable unset state, an intermediate sheet of paper-like material impregnated with a fast-curing thermo-setting resin in a flowable unset state, and a surface member comprising wood veneer material normally penetrable by resins under high pressures, the exposed face of the said wood veneer material being free of resin, subjecting the assembly as a unit and while both said resins are still in a flowable unset state to relatively low pressure sufficient partially to compact it but not sufficient to force the resin through the wood veneer member, maintaining the low pressure and heating the assembly as a unit until the fast-curing resin has substantially set, then while the slow-curing resin is still in a flowable unset state substantially increasing the pressure further to compact the assembly and heating until the slow-curing resin has substantially set, the fast-cured resin forming an intermediate dam serving to block flow of resin through the wood veneer when the pressure is increased.

4. A method of manufacturing a resin-bonded composite product having a wood veneer surface free of resin which comprises arranging in superposed relation a core member comprising fibrous material impregnated with a slow-curing thermo-setting resin in a flowable unset state, an intermediate sheet of material, carrying a fast-curing resin in a flowable unset state, and a surface member comprising wood veneer material normally penetrable by resins under high pressures and having its face contiguous to the intermediate sheet coated with fast-curing thermo-setting resin, the other face of the said wood veneer element being free of resin subjecting the assembly as a unit and while both said resins are still in a flowable unset state to relatively low pressure sufficient partially to compact it but not sufficient to force the resin through the wood veneer material, maintaining the low pressure and heating the assembly as a unit until the fast-curing resin has substantially set, then while the slow-curing resin is still in a flowable unset state substantially increasing the pressure further to compact the assembly and heating until the slow-curing resin has substantially set, the fast-cured resin on the inner face of the wood veneer and on the intermediate sheet combining to form an intermediate dam serving to block flow of resin through the wood veneer when the pressure is increased.

WALTER R. HICKLER.

REFERENCES CITED

The following references are of record in the file of this patent:

UNITED STATES PATENTS

| Number | Name | Date |
|---|---|---|
| 1,299,747 | McClain | Apr. 8, 1919 |
| 1,318,742 | Frederick | Oct. 14, 1919 |
| 1,476,570 | Adams | Dec. 4, 1923 |
| 1,597,538 | Novotny et al. | Aug. 24, 1926 |
| 1,597,539 | Novotny et al. | Aug. 24, 1926 |
| 2,227,212 | Beck | Dec. 31, 1940 |
| 2,348,740 | Jennings et al. | May 16, 1944 |

FOREIGN PATENTS

| Number | Country | Date |
|---|---|---|
| 502,409 | Great Britain | Mar. 13, 1939 |